United States Patent [19]

Djordjevic

[11] Patent Number: 5,784,764
[45] Date of Patent: Jul. 28, 1998

[54] COUPLING DEVICE FOR QUICK ENGAGEMENT AND RELEASE

[76] Inventor: Alexander S. Djordjevic, 1451 Treat Blvd., #235, Walnut Creek, Calif. 94596

[21] Appl. No.: 742,668

[22] Filed: Nov. 4, 1996

[51] Int. Cl.[6] .................................................. F16L 33/06
[52] U.S. Cl. ...................................... 24/279; 24/19
[58] Field of Search ............................ 411/368, 147, 411/313, 963; 248/74.1; 403/398, 320; 24/20 LS, 19, 68 R, 517, 569, 279–286

[56] References Cited

U.S. PATENT DOCUMENTS

| | | | |
|---|---|---|---|
| 1,817,475 | 8/1931 | Becker | 24/68 R X |
| 1,883,041 | 10/1932 | Somers | 24/285 |
| 2,205,742 | 6/1940 | Bowers | 24/68 R X |
| 2,550,575 | 4/1951 | Malcolm | 24/19 X |
| 3,161,721 | 12/1964 | Torr | 24/517 X |
| 3,167,286 | 1/1965 | Sherburne | 24/279 X |
| 3,301,121 | 1/1967 | Newcomer | 411/368 |
| 4,281,213 | 7/1981 | Sciscione | 24/569 X |
| 4,507,562 | 3/1985 | Whited | 24/517 X |
| 4,870,722 | 10/1989 | Shell, Jr. | 24/517 X |
| 5,357,654 | 10/1994 | Hsing-Chi | 24/274 WB X |

FOREIGN PATENT DOCUMENTS

| | | | |
|---|---|---|---|
| 600189 | 6/1960 | Canada | 24/279 |
| 936323 | 7/1948 | France | 24/569 |

OTHER PUBLICATIONS

Relevant Portions of the Owner's Manual for the Nitrous Oxide Systems' product; Dated Feb. 1993 pp. 6–11 for K17 numbers 2101, 2102.

Primary Examiner—James R. Brittain
Attorney, Agent, or Firm—Dergosits & Noah LLP

[57] ABSTRACT

A quick engagement and release device for adjustably coupling the two flanges of a C-shaped bracket. The device incorporates a bolt and a first nut for fixing the bolt to one of the flanges while a thumb nut adjustably couples the other flange to the bolt. The device provides for a quick and convenient device for one-handed coupling and uncoupling of the device to the flanges of the C-shaped bracket without requiring tools.

2 Claims, 6 Drawing Sheets

COUPLING DEVICE FOR QUICK ENGAGEMENT AND RELEASE

FIELD OF THE INVENTION

This invention relates to the field of coupling devices. More specifically, this invention relates to the field of coupling devices which allow for quick engagement and release.

BACKGROUND OF THE INVENTION

Many different coupling devices are known for holding together two elements. These devices include nails, screws, clamps and nut & bolt combinations. The applications for such devices are numerous and widespread. One such application involves the nitrous oxide systems used by many automobile enthusiasts.

A consistent endeavor of automobile enthusiasts is to increase the performance of their automobiles. One particularly effective method for increasing engine performance is to incorporate a nitrous oxide system. Nitrous oxide systems include a tank of nitrous oxide secured within the automobile's trunk with brackets and a hose for transporting the nitrous oxide to the engine. Although extremely effective in enhancing an engine's performance, a drawback of nitrous oxide systems is that the nitrous oxide tanks are quickly depleted during use. Frequent changes of the tanks are therefore required.

Conventional nitrous oxide systems such as those manufactured and marketed by Nitrous Oxide Systems™ (Cypress, Calif.); Top Gun Nitrous Systems# (Tyler, Tex.) and Compucar™ Nitrous Systems (North Augustine, S.C.) are provided to consumers in the form kits with all of the necessary hardware for installation of the system into any vehicle. FIG. 1 illustrates a conventional bracket 2 which includes a trapezoidal shaped base 4 which is coupled to the vehicle and a flexible C-shaped clamp 6 within which the tank (not shown) is placed. The C-shaped clamp includes an upper bracket flange 8 and a lower bracket flange 10 which are secured together by a nut 12 and bolt 14. By tightening the nut and bolt, a user is able to control the tension of the C-shaped clamp around the tank. Unfortunately, these nut and bolt combinations require two wrenches for their engagement and release, one to hold the bolt head and the other to hold the nut. This results in a time consuming and inconvenient procedure for changing tanks.

What is needed is a coupling device that allows for quick engagement and release. What is further needed is a device that does not require tools for engagement and release and further that provides for one-handed use. What is still further needed is a device that allows for the user to adjust the tension of the bracket around the tank.

SUMMARY OF THE INVENTION

The present invention provides for a quick engagement and release device for coupling the two flanges of a C-shaped clamp together. In a preferred embodiment, the present invention provides for a coupling device for securing a first and a second flange of a C-shaped clamp together, comprising: a) a C-shaped clamp having a first and a second flange; and b) a connector for adjustably coupling the first flange to the second flange, wherein the connector is adjustable by the user without the use of a tool.

The preferred embodiment further contemplates a connector comprising: a) an anchor comprising: i) a bolt having a threaded shaft extending from a head, the threaded shaft designed to fit through a first aperture in the first flange; and ii) a nut for securing the bolt in the first aperture in the first flange; and b) a thumb nut for receiving the threaded shaft after the threaded shaft is fed through a second aperture in the second flange.

The preferred embodiment still further contemplates a connector comprising: a) a socket secured to the first flange; and b) a plunger coupled to the socket through an aperture in the second flange.

The preferred embodiment still further contemplates a connector comprising: a) a brace having left, right, top and bottom edges, and first and second sides, wherein the brace is hinged to the first flange, b) a first serrated strip having a first serrated edge coupled to the first side of the brace wherein the first serrated edge faces the right edge of the brace; c) a hooked latch having left, right, top and bottom edges, and first and second sides, wherein the hooked latch is configured to hook onto the second flange; d) a second serrated strip having a second serrated edge coupled to the second side of the hooked latch wherein the second serrated edge faces the left edge of the latch; e) a gear having teeth, the gear seated between the first and second serrated edges wherein the teeth are engaged with the first and second serrated edges; and d) a handle coupled to the gear; whereby rotating the handle in a first direction correspondingly rotates the gear in the first direction and translates the brace and the hooked latch together thereby translating the first and second flanges together, and whereby rotating the handle in a second opposite direction rotates the gear in the second direction and translates the brace and the hooked latch apart thereby translating the first and second flanges apart.

The present invention further provides for another preferred coupling device for securing a first and a second parallel flange of a C-shaped clamp together comprising: a) a C-shaped clamp having a first and a second flange wherein the first flange has an aperture coaxial with an aperture in the second flange; b) a bolt having a longitudinal threaded shaft extending from a head, the threaded shaft designed to fit through the aperture in the first flange; c) a first nut for securing the bolt in the aperture in the first flange such that the first flange is secured between the first nut and the bolt head and the threaded shaft extends towards the second flange; and d) a second nut designed to fit on the threaded shaft of the bolt for adjustably connecting the second flange to the first flange such that when the threaded shaft is inserted through the second flange aperture and connected to the threaded shaft, the second flange is adjustably secured between the first and second nuts so that the user can quickly connect and release the first and second flanges of a C-shaped clamp with only one hand and without any tools.

It is contemplated that the coupling device further comprise a rubber washer between the bolt head and the first flange for ensuring that the bolt head does not pass through the aperture of the first flange. It is still further contemplated that the coupling device further comprise a locking washer designed to fit around the threaded shaft such that the washer is positioned between the first flange and the first nut to prevent the first nut from releasing from the first flange. It is contemplated that the second nut is a thumb nut or a wingnut.

The present invention also provides for a preferred method for adjustably coupling a first and a second parallel flange of a C-shaped clamp together wherein the first and second flanges each have an aperture, the method comprising the steps of: a) providing a bolt having a threaded shaft extending from a bolt head, a first nut and a second nut; b) securing the bolt through the aperture of the first flange with the first nut; c) feeding the threaded shaft through the aperture of the second flange; and d) engaging the threaded shaft with the second nut whereby the second flange is adjustably seated between the nut and the first flange. It is contemplated that the second nut is a thumb nut or a wingnut.

DETAILED DESCRIPTION

The present invention provides for a quick engagement and release device for adjustably coupling the two flanges of a nitrous oxide bracket together, thereby securing the nitrous oxide tank within an automobile. While described here for use with a nitrous oxide system, those skilled in the art will recognize that the present invention has broader application.

Figure 1:
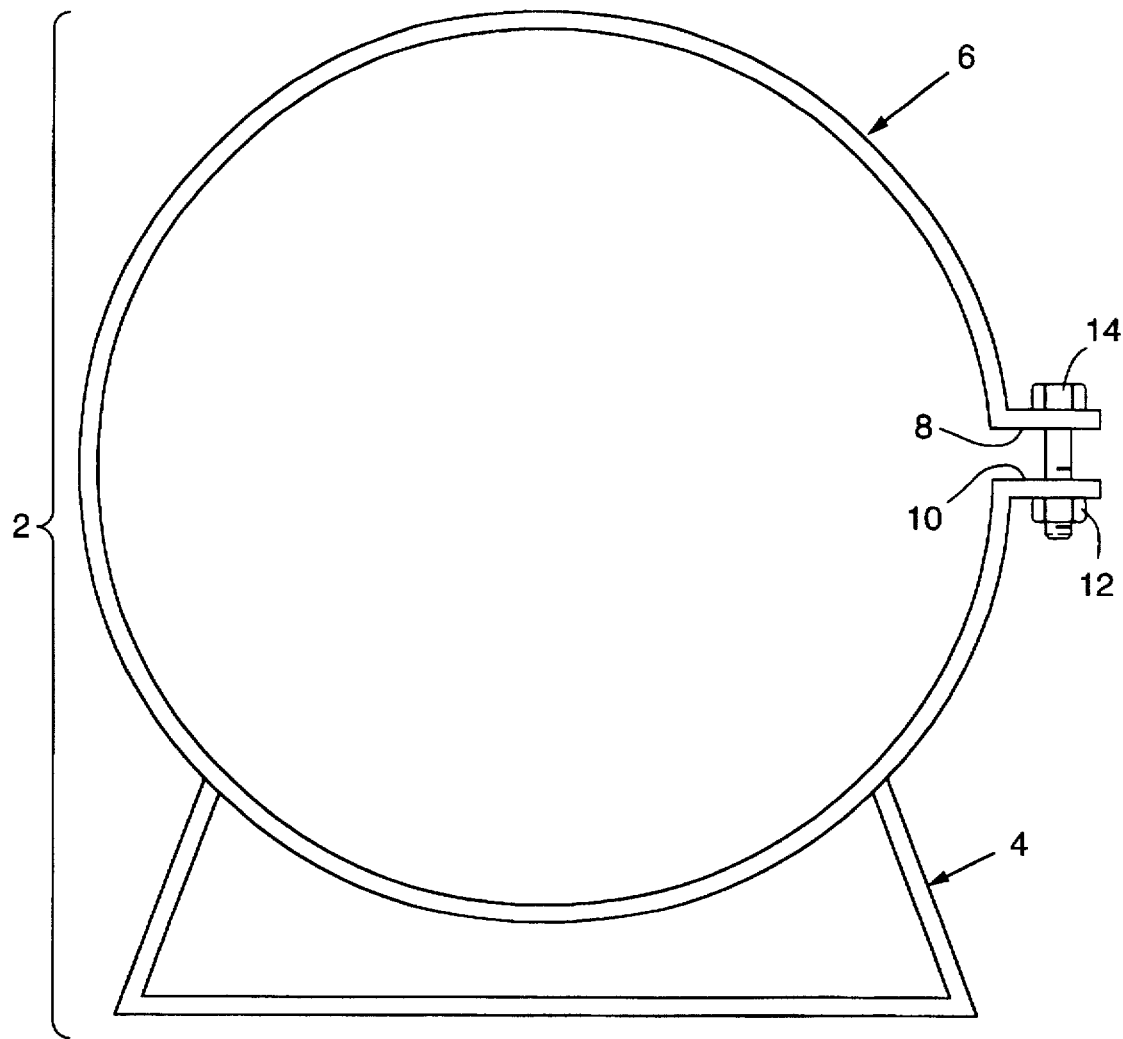
FIG. 1 illustrates a nitrous oxide bracket and prior art coupling device.
Figure 2:
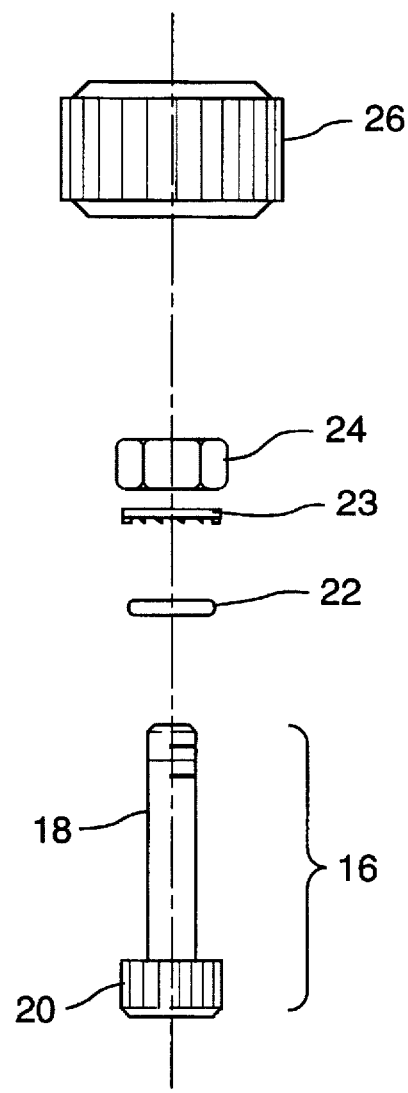
FIG. 2 illustrates an exploded diagram of the preferred embodiment of the present invention.

FIG. 2 illustrates an exploded diagram of the preferred embodiment of the present invention. A bolt 16 (¼-20-1¼ inch Alan bolt; Earl's Performance Products—Lawndale, Calif.) comprising a head 20 and a threaded shaft 18 is designed to receive a rubber washer 22, a locking washer 23 and a first nut 24 (¼-20 Keps Lock Nut; The Screw Shop—Concord, Calif.). Although illustrated here as two separate elements, the locking washer 23 and first nut 24 may be integrally formed or permanently coupled together. A thumb nut 26 (Part No. 161108; Earl's Performance Products) is also provided for screwing onto the threaded shaft 18 of the bolt 16.

Figure 3:
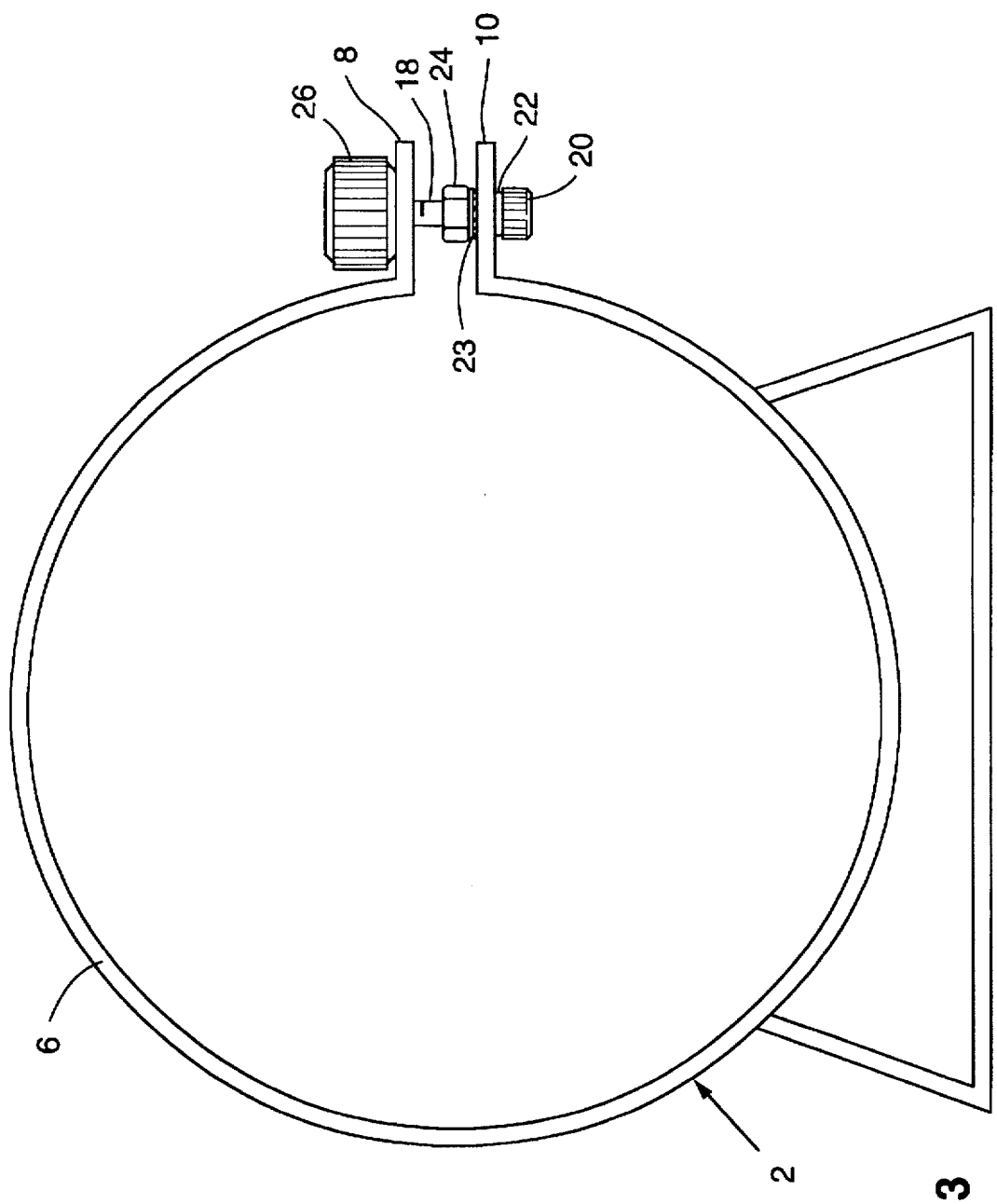
FIG. 3 illustrates a diagram of the preferred embodiment of the present invention coupled to a nitrous oxide bracket.

In operation, the threaded shaft is fed through the rubber washer 22 so that the rubber washer 22 is seated adjacent to the bolt head 20. As shown in FIG. 3, the threaded shaft 18 is then fed through an aperture (not shown) located in the lower bracket flange 10 so that the rubber washer 22 is also seated adjacent to the lower bracket flange 10. The rubber washer 22 ensures that the bolt head 20 cannot pass through the aperture in the lower bracket flange 20 if the aperture is larger than the bolt head 20. The locking washer 23 and first nut 24 are subsequently screwed onto the threaded shaft 18 for anchoring the bolt to the lower bracket flange 10. The locking washer 23 ensures that the first nut 24 remains securely engaged with the threaded shaft 18 and the lower bracket flange 10.

It should be noted, however, that if the aperture located in the lower bracket flange 8 is appropriately smaller than the bolt head 20, the rubber washer 22 is not necessary. It should further be noted that the locking washer 23 is not necessary for adequate operation of the present invention. It should still further be noted that bolt 16 can alternatively be secured to the upper bracket flange 8 in the same manner described above.

It is also contemplated that other methods be used for securing the bolt 16 to the first flange thereby doing away with the necessity of the rubber washer 22, locking washer 23 and first nut 24. For example, the bolt can be welded to the first flange or be integral with the first flange.

With the bolt 16 coupled to the lower bracket flange 10, the threaded shaft 18 is fed through an aperture (not shown) in the upper bracket flange 8. A thumb nut 26 is then connected to the threaded shaft 18 by rotating the thumb nut 26 on the threaded shaft 18 so that the upper bracket flange 8 is seated between the thumb nut 26 and the first nut 24. A thumb nut refers to a nut having a threaded aperture for receiving a threaded bolt. In a preferred embodiment, the outer circumference of the nut is circular having a grated surface to facilitate use without tools. Generally, thumb nuts also have a larger circumference than conventional nuts having the same inner diameter aperture which also facilitates use without tools. It is also contemplated that other shapes of thumb nuts having different shapes be incorporated. For example, thumb nuts in the shape of a star, square or oval may be incorporated.

By adjusting the position of the thumb nut 26 on the threaded shaft 18, the tension of the C-shaped clamp 6 can be adjusted, thereby controlling the security of the nitrous oxide tank within the bracket 2. It is also contemplated that elements other than a thumb nut 26 be incorporated with the present invention. For example, a wing nut can also be included.

Figure 4:
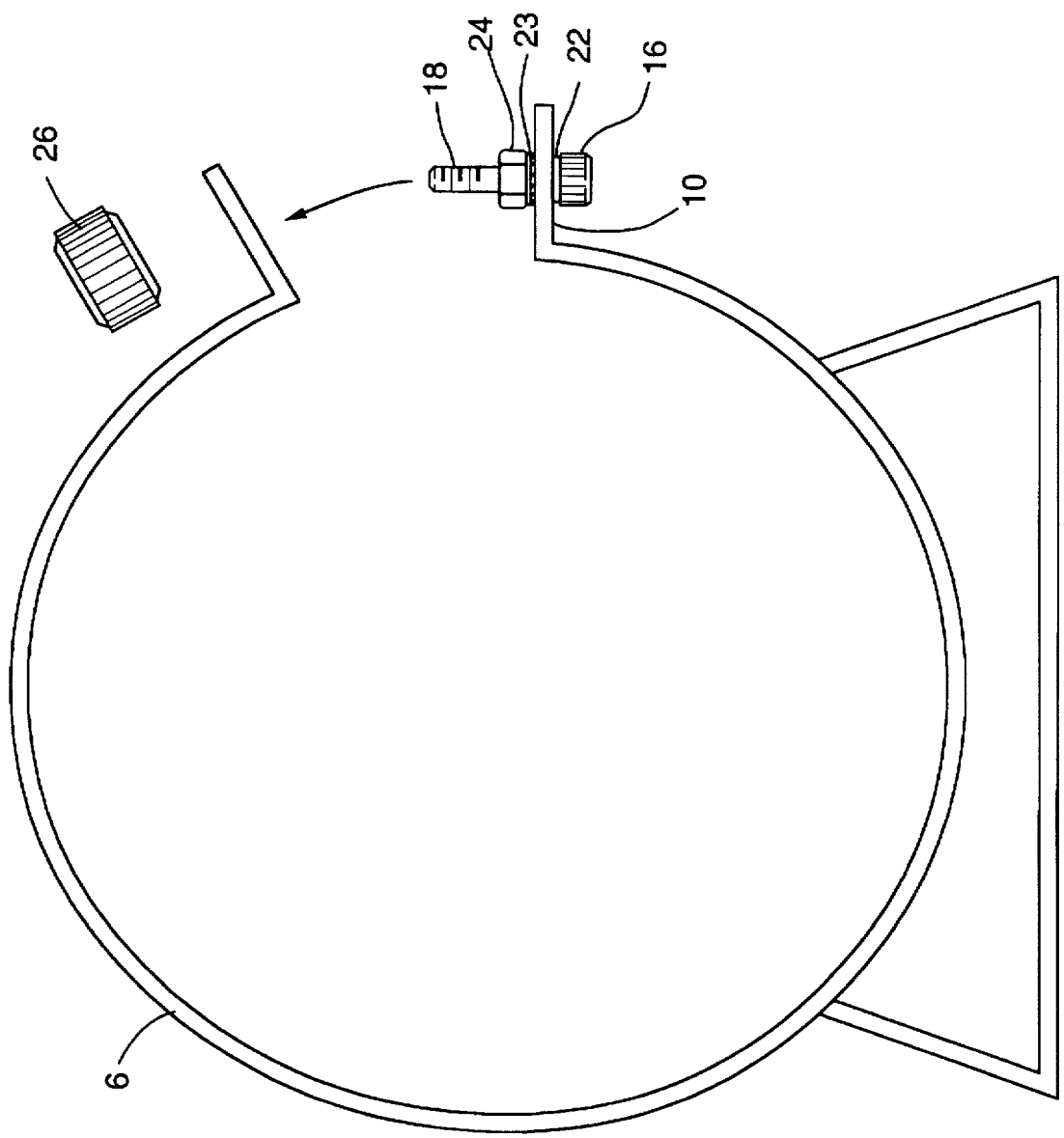
FIG. 4 illustrates a diagram of a portion of the preferred embodiment of the present invention coupled to a nitrous oxide bracket with the bracket open.

FIG. 4 illustrates that the bolt 16, rubber washer 22, locking washer 23 and first nut 24 remain secured to the lower bracket flange 10 when the thumb nut 26 is removed from the threaded shaft 18 and the C-shaped clamp 6 is open.

One skilled in the art will appreciate that the present invention provides for a more efficient device for securing a nitrous oxide tank within a bracket. Not only can a user secure and release the tank without tools, but the task can be performed with only one hand. Furthermore, because tools are not required, the time involved in securing and releasing the bracket is less than with prior art nut and bolt combination.

Figure 5A:
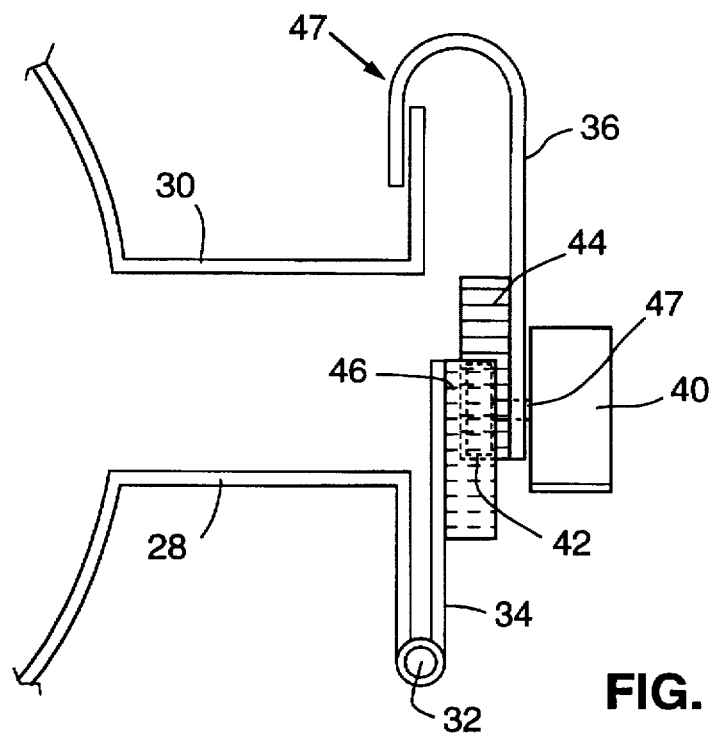
FIG. 5A illustrates a side view of another embodiment of the present invention coupled to the two flanges of a C-shaped clamp.

FIG. 5A illustrates an alternate embodiment of the present invention. Here, a different nitrous oxide tank bracket is incorporated wherein a first flange 28 is "L" shaped having a downward turn and a second flange 30 is "L" shape with an upward turn. The first bracket is coupled through a hinge 32 to brace 34. Brace 34 is coupled through a tightening mechanism 38 to latch 36. A handle 40 is also coupled to the tightening mechanism 38.

Figure 5B:
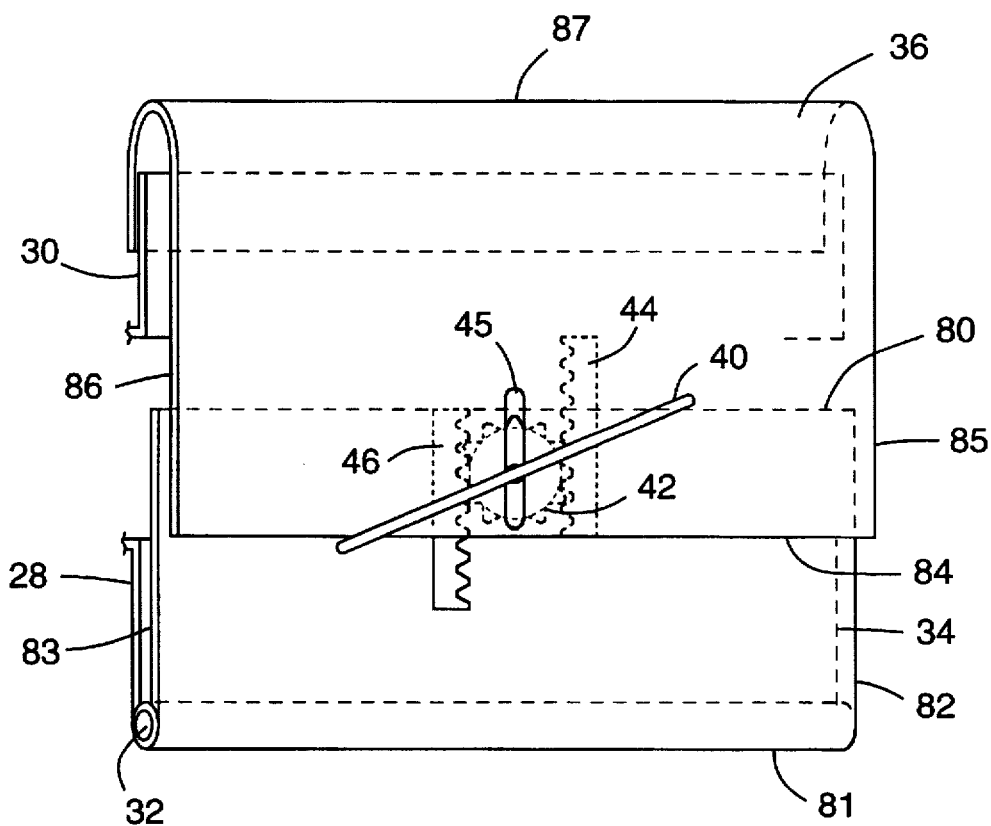
FIG. 5B illustrates a plan view of the embodiment taken from the right side of FIG. 5A.

FIG. 5B illustrates a perspective view of the alternate embodiment illustrated in FIG. 5A in more detail. In order to provide a point of reference, the latch 36 is considered to have a top edge 87, a bottom edge 84, a left edge 86 and a right edge 85. The brace 34 is considered to have a top edge 80, a bottom edge 81, a left edge 83 and right edge 82. Furthermore, the sides of the brace 34 and latch 36 facing the viewer are considered the front sides (first sides) and the sides facing away from the viewer as the back sides (second sides). A first serrated strip 46 is coupled to the front side of the brace 34 with its serrated edge facing the right edge 82. A second serrated strip 44 is coupled to the back side of the latch 36 with its serrated edge facing the left edge 86. A gear 42 is seated between the first and second serrated strips 46 and 44 such that the teeth of the gear 42 are engaged with the serrations of the first and second serrated strips 46 and 44. A handle 40 is coupled via a pin 47 (see FIG. 5A) and through a slot 45 in the latch 36, to the gear 42. By rotating the handle 40 in a counterclockwise direction, the gear 42 is likewise rotated, thereby forcing the first serrated strip 46 downward and the second serrated strip 44 upward. This has the effect of translating the brace 34 and the latch 36 away from the other thereby relaxing the latch's 36 tension on the upper L-shaped bracket 30. The latch 36 can then be unhooked from the upper flange 30 thereby allowing upper flange 30 to be separated from lower flange 28. By rehooking the latch 36 on the upper flange 30 and reversing the handle's 40 direction of rotation, the brace 34 and latch 36 are translated in the opposite direction, thereby tightening the latch's 36 tension on the upper L-shaped bracket 30.

Figure 6A:
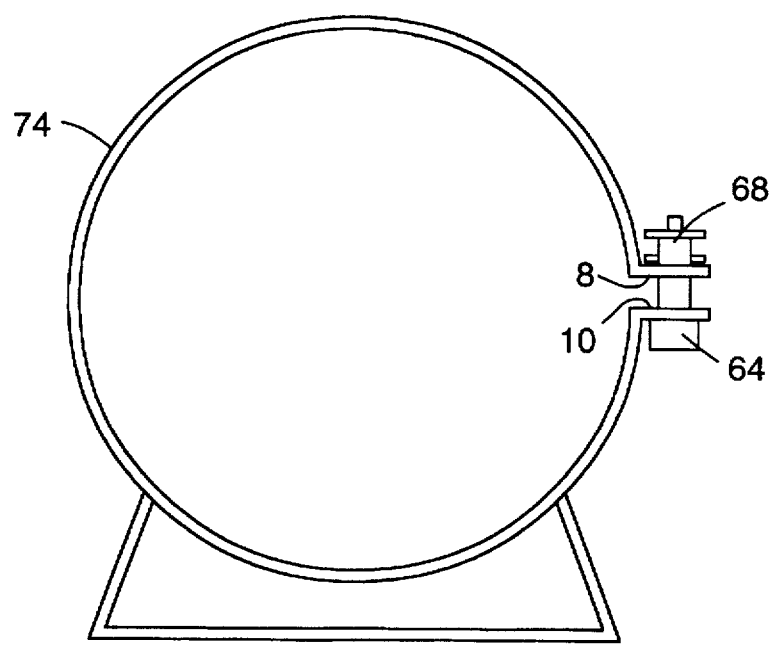
FIG. 6A illustrates a side view of another embodiment of the present invention coupled to the two flanges of a C-shaped clamp.
Figure 6B:
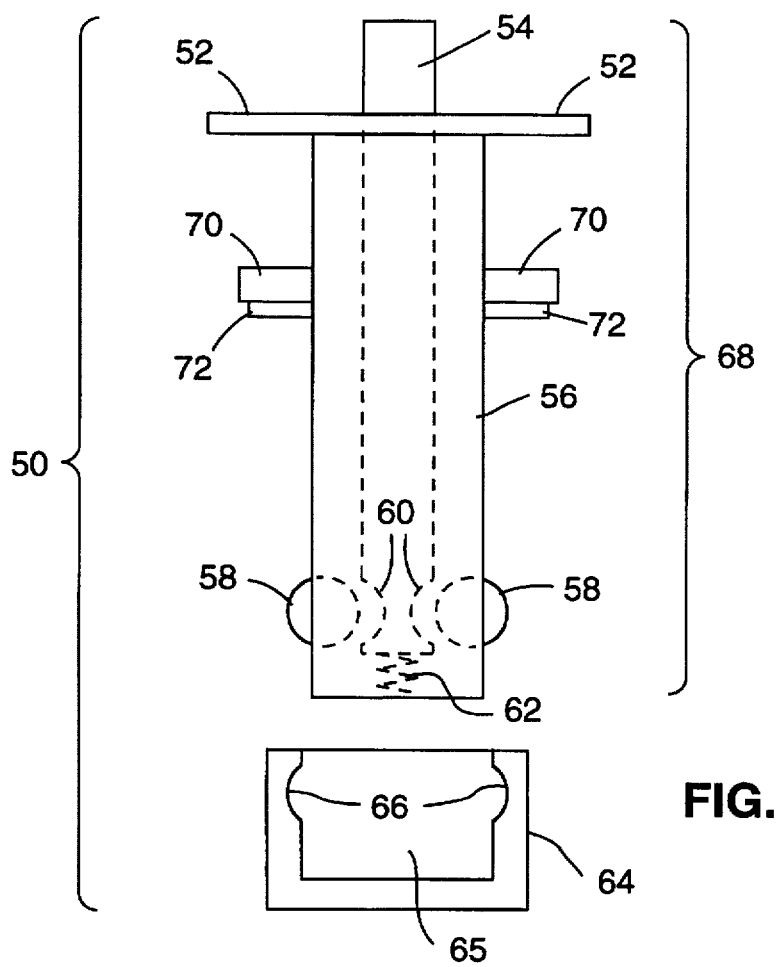
FIG. 6B illustrates a detailed view of the embodiment illustrated in FIG. 6A.

FIGS. 6A and 6B illustrate a second alternate embodiment which incorporates a ball bearing quick release. Basically, a pin 68 is inserted through an aperture in the upper bracket flange 8 and coupled to a socket 64 which is secured to the lower bracket flange 10. Any manner of securing the socket to the lower bracket flange may be incorporated such as by welding. FIG. 6B illustrates the pin 68 and socket 64 in more detail.

The pin 68 comprises a tubular shaft 56 having two finger flanges 52 configured to house a plunger 54. The plunger 54 has two roughly semicircular depressions 60 on opposite sides of one end for receiving two ball bearings 58, one in each depression 60. The tubular shaft 56 also has apertures adjacent to the ball bearings 58 for allowing the ball bearings to partially extend out of the tubular shaft 56. It should be noted that the size of the apertures must be small enough that the ball bearings 58 cannot be removed from the tubular shaft 56. Furthermore, the distance between the sides of the plunger 54 and the inner wall of the tubular shaft 56 must be small enough that the ball bearings 58 do not completely fall to the bottom of the tubular shaft 56. A spring 62 secured t the bottom inside surface of the tubular shaft 56 provides a biasing tension on the plunger 54.

The socket 64 comprises a pocket 65 having two semicircular indents 66 diametrically opposed on the inside surface of the socket 64 for receiving the two ball bearings 58.

In operation, a user hooks her index and middle finger under the two finger flanges 52 and uses his or her thumb to push the plunger 54 into the tubular shaft 56. In the relaxed position, the sides of the plunger 54 maintain the ball bearings 58 in an extending position through the apertures of the tubular shaft 56. When the plunger is depressed, however, the ball bearings 58 recede into the depressions 60 of the plunger 54. This allows the user to insert the pin 68 into the socket 64. By releasing the pressure on the plunger, the outside surface of the plunger 54 below the depressions 60 engage with the ball bearings 58 and push the bearings out past the walls of the tubular shaft 56 and into the indents 66. This locks the pin 68 into the socket 64.

Two stop flanges 70 are also secured to the outside surface of the tubular shaft 56 and have cushions 72 for contacting the upper bracket flange 8. It is these flanges 70 and cushions 72 which secure the bracket flange 8 in a fixed position with the lower bracket flange 10. The distance between the cushions 72 and the bottom of the tubular shaft 56 should be such that when the pin 68 is secured in the socket 64, the C-shaped clamp is closed so that the upper bracket flange 8 and the lower bracket flange 10 are in engaging contact. This allows the tank (not shown) to be firmly held in place within the C-shaped clamp 74.

From the above description it is clear that the present invention provides for a coupling device that allows for quick engagement and release. The present invention is further capable of being utilized without tools and with only one hand. The present invention is still further capable of allowing a user to adjust the tension of a nitrous oxide tank bracket around the tank.

While the present invention has been described in detail by way of illustration and example for purposes of clarity of understanding, it will be understood by those skilled in the art that certain changes and modifications may be made to the above-described embodiments without departing from the spirit of the invention and scope of the appended claims.

I claim:

1. A coupling device for securing a first and a second flange of a C-shaped clamp together, comprising:

a) a C-shaped clamp having a first and a second flange; and b) a connector for adjustably coupling the first flange to the second flange, wherein the connector is adjustable by the user without the use of a tool and wherein the connector comprises:

i) a brace having left, right, top and bottom edges, and first and second sides, wherein: th brace is hinged to the first flange, ii) a first serrated strip having a first serrated edge coupled to the first side of the brace wherein the first serrated edge faces the right edge of the brace;

iii) a hooked latch having left, right, top and bottom edges, and first and second sides, wherein the hooked latch is configured to hook onto the second, flange;

iv) a second serrated strip having a second serrated edge coupled to the second side of hooked latch wherein the second serrated edge faces the left edge of the latch;

v) a gear having teeth, the gear seated between the first and second serrated edges wherein the: teeth are engaged with the first and second serrated edges; and vi) a handle coupled to the gear; whereby rotating the handle in a first direction correspondingly rotates the gear in the first direction and translates the brace and the hooked latch together thereby translating the first and second flanges together, and whereby rotating the handle in a second opposite direction rotates the gear in the second direction and translates the brace and the hooked latch apart thereby translating the first and second flanges apart.

2. A coupling device for securing a first and a second parallel flange of a C-shared clamp together comprising:

a) a C-shaped clamp having a first and a second flange wherein tie first flange has an aperture coaxial with an aperture in the second flange;

b) a bolt having a longitudinal threaded shaft extending from a bead, the threaded shaft designed to fit through the aperture in the first flange;

c) a first nut for securing the bolt in the aperture in the first flange such that the first flange is secured between the first nut and the bolt head and the threaded shaft extends towards he second flange; and d) a thumb nut designed to fit on the threaded shaft of the bolt for adjustably connecting the second flange to the first flange such that when the treaded shaft is inserted through the second flange aperture and connected to the threaded shaft, the second flange is adjustably secured between the first and second nuts so that the user can quickly connect and release the first and second flanges of a C-shaped clamp with only one hand an without any tools;

e) a rubber washer between the bolt head and the first flange for ensuring that the bolt head does not pass through the aperture of the flange; and f) a locking washer designed to fit around the threaded shaft such that the washer is positioned between the first flange and the first nut to prevent the first nut from releasing from the first flange.

* * * * *